June 1, 1926.

F. A. MARSH 1,587,394

WATER GAUGE AND TEMPERATURE INDICATOR

Filed Oct. 3, 1923

Inventor

Frederick A. Marsh.

By Eccleston & Eccleston.

Attorneys.

Patented June 1, 1926.

1,587,394

UNITED STATES PATENT OFFICE.

FREDERICK A. MARSH, OF COLUMBUS, OHIO.

WATER GAUGE AND TEMPERATURE INDICATOR.

Application filed October 3, 1923. Serial No. 666,330.

This invention relates to a water gauge, and temperature indicator of the general type disclosed in my Patent #1,449,124, dated March 20, 1923, and has for its object to simplify the construction shown therein by providing novel means for filling the indicator tube.

A further object of the invention resides in providing a float for indicating the presence of water in the tube, and in so designing and arranging the float, tube and thermometer as to provide a simple and unitary structure which may be readily attached to the ordinary automobile cap.

Other objects and advantages of the invention will be apparent from the following description when taken in connection with the accompanying drawings, in which:—

Figure 1:
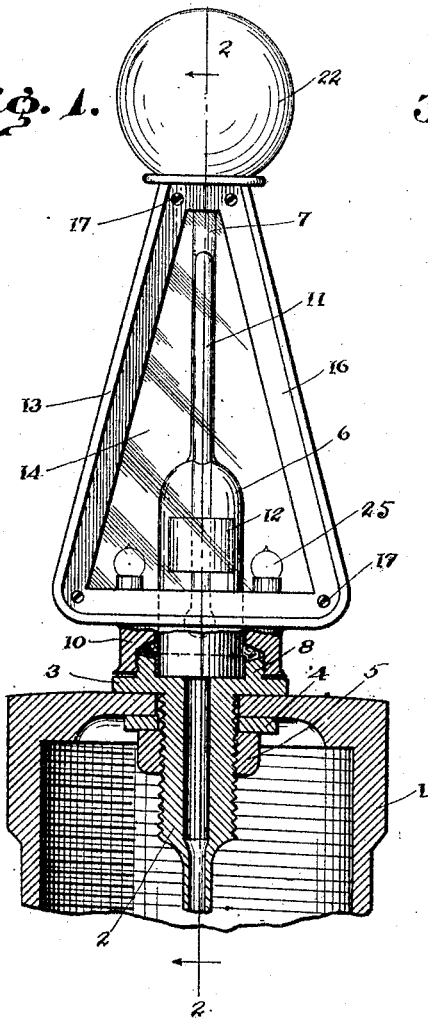
Figure 1 is a front elevation of the device partly in section.

Referring to the drawings more in detail, the numeral 1 indicates a radiator cap of usual construction which is centrally perforated for the reception of the exteriorly threaded metal nipple 2. This nipple is formed with a flange 3 for engagement with the upper surface of the cap, and is locked in engagement therewith by means of the washer 4 and nut 5.

Seated in the upper end of the metal nipple 2 is a transparent tube 6, preferably of glass. Tube 6 is narrowed in its upper portion and this narrowed portion is indicated by numeral 7. In order that the tube 6 may be connected liquid tight to the nipple 2, an upwardly-extending flange 8 is provided in which the lower end of the tube is seated. Suitable packing 9 is positioned around the tube 6 and clamped in place by means of the packing nut 10.

Extending concentrically through the top of the enlarged portion of tube 6 is a thermometer 11 which is welded or otherwise secured therein. Surrounding the lower or enclosed end of the thermometer is an annular float 12 for visually indicating the presence of water in the tube 6.

A substantially triangular frame 13 is rigidly connected to the packing nut 10 and is provided with front and rear panels 14 and 15 of beveled glass or the like. These panels are held in place by means of the clamps 16 which are fastened to the frame through the medium of screws 17. Dust proof washers 18 are preferably interposed between the clamps 16 and the glass panels, while several perforations 19 may be provided in the frame for permitting a circulation of air.

A stuffing box 20 which is centrally located in the upper end of the frame 13 receives the upper end of the tube 7, and is provided with a nipple 21 threaded thereto. Between the nipple 21 and the stuffing box 20 a flexible bulb 22, of rubber or the like, is clamped.

Figure 5:
Figure 5 is a cross section of a detail.

In order to cause a proper discharge of water from the nipple 2, where a very small bore is employed, it is necessary to overcome the capillary attraction thereof, and to this end I have provided a wick 23 (Figure 5) which may be secured within the lower end of the nipple by pinching the walls against the wick as indicated by numeral 24.

Electric bulbs 25 may be located in the base of the frame 13 for displaying the apparatus at night if desired.

Figure 2:
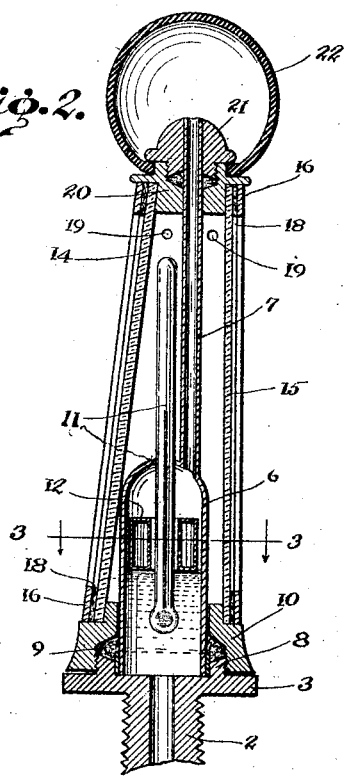
Figure 2 is a vertical section taken on line 2—2 of Figure 1.

In the operation of the device the cap 1 is removed from the radiator and the latter filled with water in the usual way. The cap then being replaced the bulb 22 is squeezed so as to drive a portion of the air from the tubes 6, 7 and nipple 2. Atmospheric pressure will then force water into the tube 6 and raise the float 12 to a position where it may be seen by the driver, as disclosed in Figures 1 and 2 of the drawings. The water in the tube 6 will of course contact the thermometer 11 which will therefore accurately indicate the temperature of the radiator. Indicia may be placed on the front panel 14 or tube 6, if desired, in order to indicate the height of the float in the tube. It may be here stated that the cubic content of the bulb 22 is such as to expel only a part of the air in the tube 6 as it is not desired to draw water into the narrowed portion 7 thereof.

Figure 4:
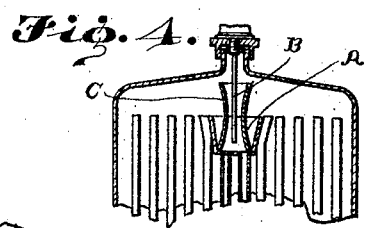
Figure 4 is a sectional view of a portion of a radiator.
Figure 3:
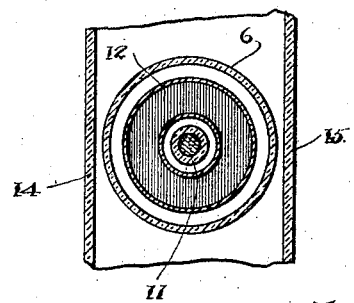
Figure 3 is a horizontal section taken on line 3—3 of Figure 2.

In Figure 4 of the drawings I have shown a construction in which the tubing of the radiator is provided with a recess A at the center of its upper surface in order that the water tube B may extend lower than would be permitted in the ordinary type of radiator; the purpose being to prevent the lower end of the tube becoming uncovered when only a small portion of the water is evaporated from the radiator, thereby giving the signal to refill much earlier than is necessary.

From the foregoing description it will be seen that I have provided a very simple and compact construction by which the temperature of the radiator is accurately determined and by which the time for refilling is promptly indicated. Furthermore, the present construction provides an extremely simple arrangement for initially placing the water in the tube 6.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is—

1. The combination with a radiator cap, of a transparent tube of substantial internal diameter throughout its length mounted therein at a point above the water in the radiator, a conduit leading from said tube to a point below the normal water line of the radiator, a thermometer partly within said tube, a float in said tube, and means for causing water to rise in said tube into engagement with the float and thermometer.

2. The combination with a radiator cap, a casing mounted thereon, transparent panels in the front and rear of said casing, and a transparent tube of substantial internal diameter throughout its length in said casing extending from end to end thereof and normally having connection with the water in the radiator, a float and thermometer concentrically mounted in said tube, and means for drawing water into the tube.

FREDERICK A. MARSH.